Aug. 14, 1956

L. E. LUFFMAN ET AL 2,758,503

COPY-HOLDING APPARATUS

Filed March 5, 1953

INVENTORS
LIONEL E. LUFFMAN
ROBERT W. BENSON
BY
Harold E. Stonebraker
ATTORNEY

Aug. 14, 1956 L. E. LUFFMAN ET AL 2,758,503
COPY-HOLDING APPARATUS
Filed March 5, 1953 3 Sheets-Sheet 2
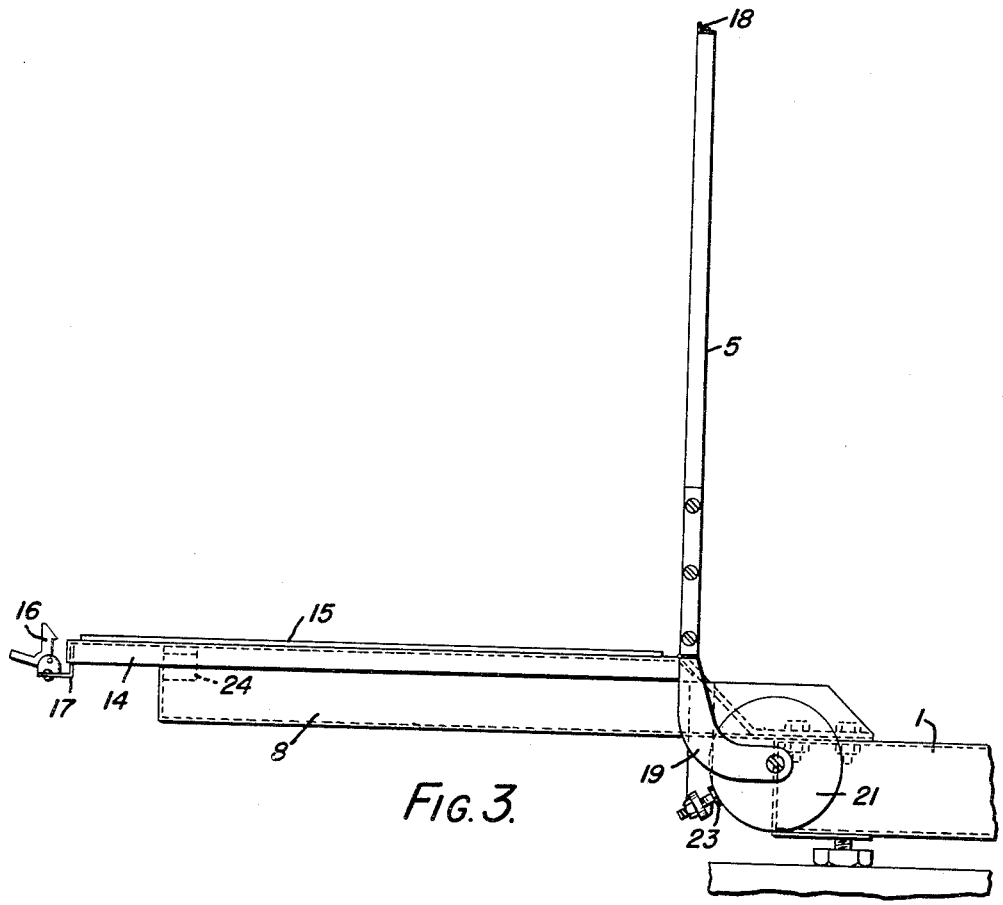
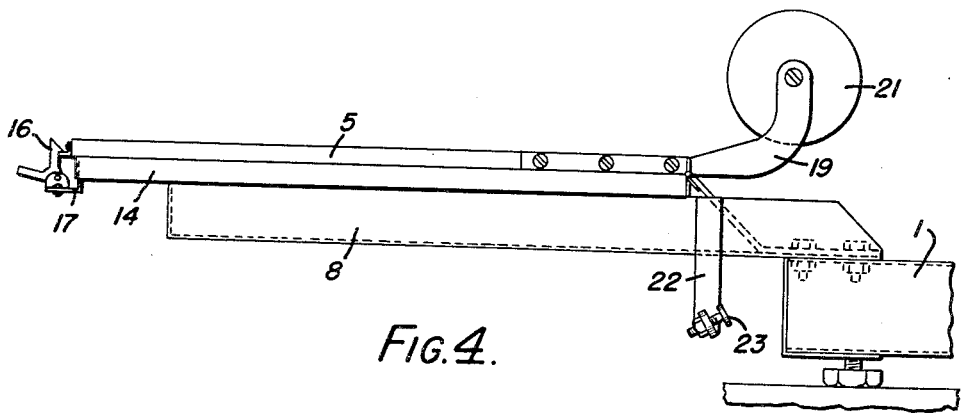
INVENTORS.
LIONEL E. LUFFMAN
ROBERT W. BENSON
BY Harold E. Stonebraker
ATTORNEY

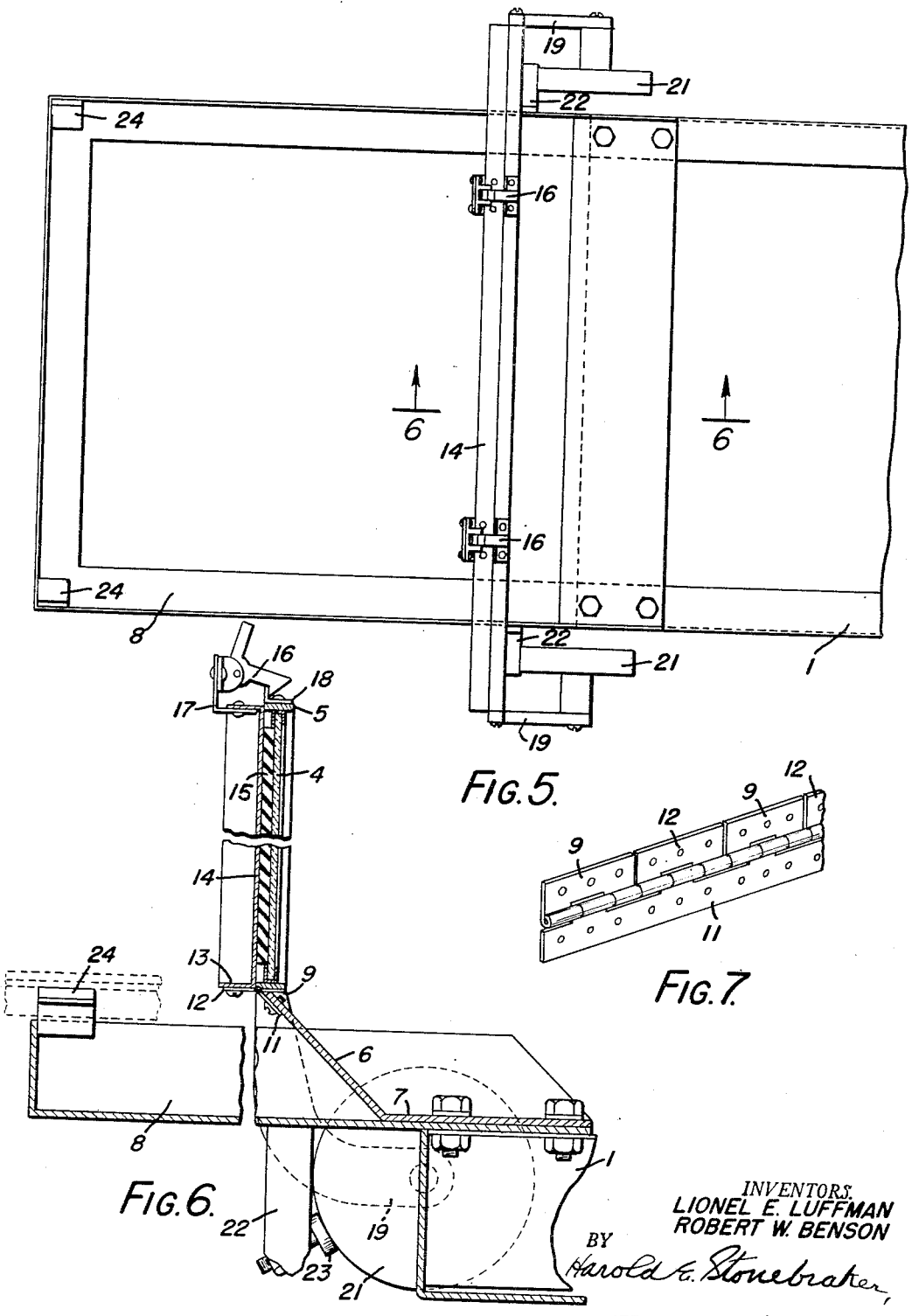

United States Patent Office 2,758,503
Patented Aug. 14, 1956

2,758,503

COPY-HOLDING APPARATUS

Lionel E. Luffman, Macedon, and Robert W. Benson, Brockport, N. Y., assignors to The Haloid Company, Rochester, N. Y., a corporation of New York Application March 5, 1953, Serial No. 340,591

2 Claims. (Cl. 88—24)

This invention relates to copy-holding apparatus for use with cameras, while particularly adapted for xerographic and photographic copying apparatus, and has for its purpose to afford a simple structure that facilitates positioning copy in proper position for exposure and insures holding the copy accurately and smoothly in the desired plane.

The invention is designed to be used with cameras in which an electrostatically charged xerographic plate is exposed to the subject to be copied to form an electrostatic image, and it has for its object to provide a structure that enables readily and correctly positioning a copy sheet on a bed member while located in a horizontal plane and maintaining the copy in place on the bed member by means of a relatively movable transparent cover that can be brought into interlocking engagement with the bed member while the latter is horizontally disposed with the copy thereon, and is thereafter unitarily movable with the bed member to vertical position in front of the camera with the copy held between the bed member and transparent cover.

A further purpose of the invention is to afford a movable bed member associated with a relatively movable transparent cover so related that the bed member and cover are held in vertical position with copy viewable through the transparent cover, and permitting relative movement of the bed member away from the transparent cover when it is desired to bring the bed member to horizontal position to release the copy and permit positioning of a new sheet of copy which can be accurately adjusted thereon and held in such position while the transparent cover is moved downwardly and interlocked with the bed member to secure the sheet of copy thereon, the bed member and transparent cover being then movable simultaneously as a single unit to vertical position.

To these and other ends, the invention consists in the construction and arrangement of parts that will appear clearly from the following description when read in conjunction with the accompanying drawings, the novel features being pointed out in the claims following the specification.

In the drawings:

Fig. 3 is a side elevation similar to Fig. 2 with the bed member lowered to its horizontal position to permit removal of a sheet of copy and insertion of a new copy sheet;

Fig. 4 is a view similar to Fig. 3 showing the position of the parts with the transparent cover lowered to hold a sheet of copy against the bed member;

Fig. 5 is a plan view of the structure with the parts positioned as in Figs. 1 and 2;

Fig. 6 is a vertical sectional view taken on line 6—6 of Fig. 5 looking in the direction indicated, and Fig. 7 is a perspective view, broken away, of the hinge unit for mounting the bed member and transparent cover.

Figure 1:
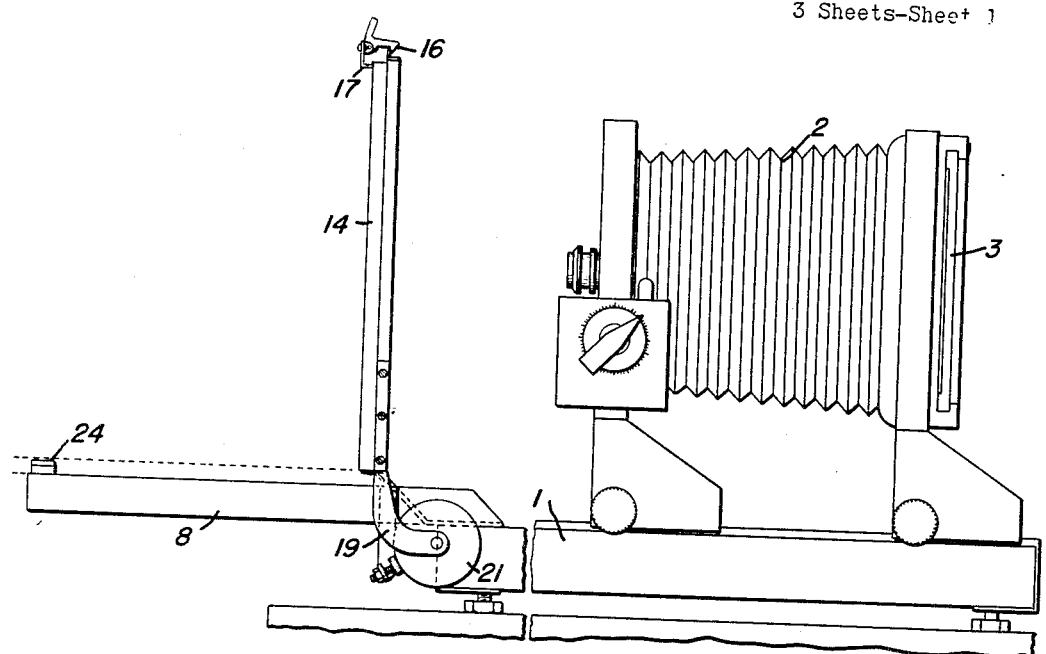
Fig. 1 is a view in side elevation illustrating a preferred embodiment of the invention and showing the bed member and transparent cover in vertical operative position with relation to a camera, and in dotted lines the position of the bed member when swung downwardly away from the transparent cover.

Referring more particularly to the drawings in which like reference numerals refer to the same parts throughout the several views, 1 designates a frame upon which is mounted in conventional fashion a xerographic camera or other photographic apparatus 2 adapted to receive an electrostatically charged xerographic plate or sensitized photographic plate 3, the camera being adjustable on the frame 1 to bring it into proper position for focusing in relation to the copy that is reproduced on the electrostatically charged xerographic or photographic sensitized plate.

For making commercial copies of drawings, letters, maps, or other records with such apparatus, it is desirable to maintain the copy in a vertical plane when exposing and to enable the operator to accurately position and secure the copy and move it into the desired vertical plane with the fewest possible operations in the shortest period of time. In order to accomplish this, there is provided a pivotally mounted bed member on which the copy can be positioned while horizontally disposed and a transparent cover pivotally associated with the bed member and arranged to be interlocked therewith for unitary movement from a horizontal to a vertical position, while permitting separation of the bed member from the transparent cover to permit retaining the latter in vertical position while the bed member is swung to horizontal position to remove the copy and position another sheet of copy.

To accomplish these purposes, there is provided a transparent cover 4 of glass or other suitable material suitably mounted in a frame 5 that is pivotally arranged on a support or bracket 6 including a portion 7 that is bolted or otherwise fixedly attached to the frame 1, while 8 designates a base extending horizontally away from the bracket 6 for a purpose that will appear presently.

The frame 5 in which the transparent plate 4 is mounted is secured to the leaves 9 of a hingle mounting, the body 11 of which is secured to the support 6 while the leaves 12 are secured to a side wall 13 of a bed member 14 that is provided on its outer surface with a mat 15 of rubber or other suitable compressible material adapted to engage a sheet of copy which is held securely thereagainst by the transparent cover 4.

The bed member 14 is held in operative relation to the transparent cover 4 by means of releasable spring-actuated pivoted catches 16 mounted upon the brackets 17 which are attached to a side wall of the bed member opposite to the aforementioned side wall 13 to which the hinge unit is connected. The pivoted spring catches 16 carried by the bed member 14 are engageable with lugs 18 mounted upon the frame 5 in which the transparent cover 4 is supported and in this fashion, the transparent cover 4 and bed member 14 are held in interlocked relation with a sheet of copy secured therebetween.

Figure 2:
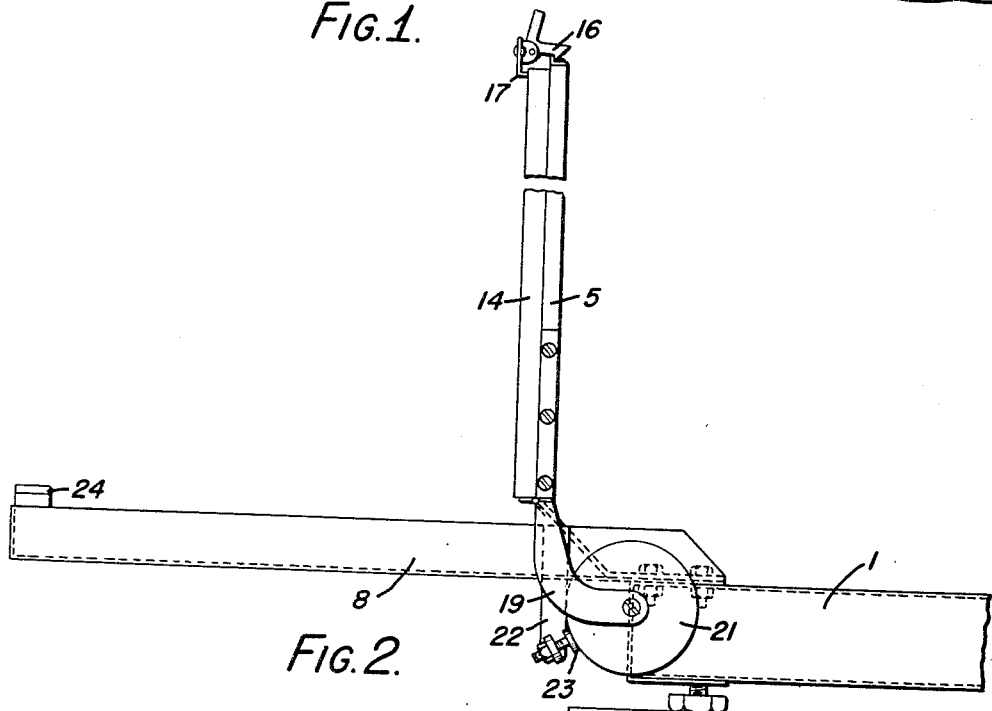
Fig. 2 is an enlraged view similar to Fig. 1 with the camera omitted and illustrating the bed member and transparent cover in vertical position for holding the copy before the camera.

In order to maintain the transparent cover 4 with the interlocked bed member in vertical or operative position, the frame 5 is provided with depending brackets or arms 19 extending laterally away from the bed member and on the opposite side of the transparent cover and supported thereon are the weighted elements 21 which are sufficient to overcome the weight of the transparent cover and bed member and hold the copy-supporting unit in vertical position, as illustrated in Figs. 1, 2 and 6. 22 designate posts depending from the base 8 and provided with adjustable stops 23 that limit downward movement of the weights 21 and arms 19, and thus the vertical or operative position of the copy-supporting means can be fixed to a nicety. 24 designate stops mounted in the base 8 and arranged to limit downward movement of the bed member 14 and to support the same when in horizontal position, as indicated in Fig. 3.

In the operation of the device, assuming the parts to be in the position illustrated in Fig. 3 with the transparent cover in upright position and the bed member horizontally disposed on the base 8, the operator positions a sheet of copy on the bed member 14 in exactly the proper desired position and thereupon swings the transparent cover 4 downwardly over the copy until the frame of the transparent cover is engaged by the spring catches 16 and interlocked with the bed member. The bed member and transparent cover are then swung upwardly as a unit with the copy interposed therebetween and held in vertical position by the weighted elements 21, see Figs. 1 and 2.

After exposure, the operator disengages the spring catches 16 from the transparent cover and pulls the bed member downwardly from the upright position of Figs. 1 and 2 to the horizontal position illustrated in Fig. 3 while permitting the transparent cover to remain in upright position. The copy can then conveniently be removed from the bed member 14 which is ready to receive a fresh sheet of copy, and the operation is repeated.

With this arrangement, the operator's work is reduced to a minimum, accurate positioning of the copy is insured, and quick easy removal of copy is made possible since it is unnecessary to move the transparent cover when separating the copy sheet from the bed member. Starting with the parts in the position illustrated in Fig. 3, a complete cycle of positioning and removing a copy sheet is effected with only three operations, namely, swinging the transparent cover down into interlocking engagement with the bed member, secondly, moving the transparent cover and bed member upwardly to vertical position, and finally swinging the bed member after exposure downwardly away from the transparent cover to permit removal of the copy sheet and insertion of a new piece of copy.

While the invention has been described with reference to the structure shown, it is not confined to the details or exact arrangement disclosed, and this application is intended to cover such modifications or departures as may come within the purposes of the improvements or the scope of the following claims.

We claim:

1. Copy-holding apparatus comprising a support, a base, a bed member pivotally mounted on the support occupying a vertical position when in operation and movable from a vertical to a horizontal position resting on said base, a transparent cover pivotally mounted on the support independently of and coaxially with the bed member, the bed member and transparent cover acting to hold a sheet of copy therebetween and movable independently of each other or unitarily about said coaxial pivotal mounting from vertical to horizontal positions, releasable means connecting the bed member and cover for unitary movement about said coaxial pivotal mounting, the bed member being freely movable under its own weight to horizontal position resting on the base when released from the cover, depending bracket arms extending downwardly from the lower end of the cover on opposite sides of the base and laterally away from the bed member and cover when they are in vertical position, and weights carried at the outer extremities of said arms and acting to hold the transparent cover in vertical position when the bed member is in horizontal position resting on the base or to hold the transparent cover and bed member in vertical position when they are interlocked.

2. Copy-holding apparatus comprising a frame, an upwardly inclined bracket having a bottom portion fixed to said frame, a hinge having a fixed leaf attached to the upper end of said inclined bracket, a bed member having movable leaves of said hinge secured to one end of the bed member, a base, said hinge leaves permitting swinging movement of the bed member from vertical to horizontal positions, the bed member when in horizontal position resting on said base, a transparent cover having movable leaves of said hinge secured to its lower end and permitting its movement from vertical to horizontal positions, the transparent cover and bed member being coaxially mounted and movable independently or unitarily about said coaxial mounting from vertical to horizontal positions, releasable means at the outer end of the bed member engageable with the transparent cover for unitary movement therewith, the bed member being freely movable under its own weight to horizontal position resting on said base when released from the cover, depending bracket arms carried by the transparent cover at its lower end and extending downwardly on opposite sides of the base and laterally away from the bed member and cover when they are in vertical position, weights carried by said bracket arms at their extremities and located on the side of said coaxial pivotal mounting opposite to the bed member and acting to hold the transparent cover in vertical position when the bed member is in horizontal position resting on said base or to hold the transparent cover and bed member in vertical position when they are interlocked, and stops located in the path of and engageable with said weights and acting to limit movement of the weights when the cover and bed member are interlocked in vertical position.

References Cited in the file of this patent

UNITED STATES PATENTS

| | | |
|---|---|---|
| 1,141,704 | French | June 1, 1915 |
| 1,209,419 | Farquhar | Dec. 19, 1916 |
| 1,214,132 | Carleton | Jan. 30, 1917 |
| 1,946,810 | Rowell | Feb. 13, 1934 |
| 2,484,809 | Austin | Oct. 18, 1949 |

FOREIGN PATENTS

| | | |
|---|---|---|
| 863,452 | France | Jan. 2, 1941 |